(12) United States Patent
Yamaguchi et al.

(10) Patent No.: US 9,327,631 B2
(45) Date of Patent: May 3, 2016

(54) SEAT CUSHION FRAME FOR VEHICLE AND PRODUCTION METHOD THEREFOR

(71) Applicant: Toray Industries, Inc., Tokyo (JP)

(72) Inventors: Koji Yamaguchi, Tokyo (JP); Masaru Tateyama, Nagoya (JP); Nobuhiko Shimizu, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/398,595

(22) PCT Filed: May 9, 2013

(86) PCT No.: PCT/JP2013/063042
§ 371 (c)(1),
(2) Date: Nov. 3, 2014

(87) PCT Pub. No.: WO2013/168768
PCT Pub. Date: Nov. 14, 2013

(65) Prior Publication Data
US 2015/0108819 A1    Apr. 23, 2015

(30) Foreign Application Priority Data

May 10, 2012   (JP) ................................. 2012-108327

(51) Int. Cl.
| | |
|---|---|
| *A47C 7/02* | (2006.01) |
| *B60N 2/68* | (2006.01) |
| *B60N 2/42* | (2006.01) |
| *B29C 45/00* | (2006.01) |
| *B29K 101/12* | (2006.01) |
| *B29K 307/04* | (2006.01) |
| *B29L 31/00* | (2006.01) |

(52) U.S. Cl.
CPC .............. *B60N 2/68* (2013.01); *B29C 45/0005* (2013.01); *B60N 2/4221* (2013.01); *B60N 2/4263* (2013.01); *B29K 2101/12* (2013.01); *B29K 2307/04* (2013.01); *B29L 2031/771* (2013.01)

(58) Field of Classification Search
CPC .... B60N 2/4263; B60N 2/42709; B60N 2/68; B60N 2/42718; B60N 2/42763
USPC ............................. 297/216.1, 452.15, 452.18
See application file for complete search history.

(56) References Cited

U.S. PATENT DOCUMENTS

| | | | | |
|---|---|---|---|---|
| 6,059,369 | A  * | 5/2000 | Bateson ................ | B29C 70/222 297/452.18 |
| 2013/0065469 | A1* | 3/2013 | Kang ...................... | B32B 5/022 442/203 |
| 2013/0278025 | A1* | 10/2013 | Wakabayashi ......... | B62K 19/16 297/195.1 |

(Continued)

FOREIGN PATENT DOCUMENTS

| | | |
|---|---|---|
| JP | 2004-338632 | 12/2004 |
| JP | 2010-220748 | 10/2010 |
| JP | 2010220748 A  * | 10/2010 |

*Primary Examiner* — Laurie K Cranmer
(74) *Attorney, Agent, or Firm* — DLA Piper LLP (US)

(57) ABSTRACT

A seat cushion frame for a vehicle includes a composite material containing reinforcing fibers which extend in at least the frame extension direction is integrated with an injection molded thermoplastic resin. The weight of the entire seat cushion frame can be greatly reduced, the rigidity and strength required for each section of the frame can be readily secured, required functions such as submarine prevention or the like, can be fulfilled, the number of components can be greatly reduced, and the overall structure can be greatly simplified.

16 Claims, 3 Drawing Sheets

(56) References Cited

U.S. PATENT DOCUMENTS

2014/0159462 A1* 6/2014 Matsumoto ............. B60N 2/68
297/452.18
2015/0044402 A1* 2/2015 Carson, Jr. ............... A47C 5/12
428/34.5
2015/0044419 A1* 2/2015 Carson, Jr. ............. B64D 11/06
428/138

* cited by examiner

Prior Art

SEAT CUSHION FRAME FOR VEHICLE AND PRODUCTION METHOD THEREFOR

TECHNICAL FIELD

This disclosure relates to a seat cushion frame for a vehicle and a production method therefor and, more specifically, to a seat cushion frame for a vehicle which lowers the weight of the frame as well as achieves an increase in rigidity and reduces the number of components, and a production method therefor.

BACKGROUND

For example, as shown in FIG. 6, a seat cushion frame for a vehicle is generally composed of a frame 101 for a seat cushion and a frame 102 for a seat back connected thereto (for example, JP-A-2004-338632). A conventional seat cushion frame for a vehicle is formed mainly as a steel sheet metal construction, and a resin seat cushion frame substantially does not exist.

Further, for a seat cushion frame for a vehicle, there is a mechanism that prevents a front section of the seat cushion frame from excessively sinking (hereinafter, also referred to as a submarine prevention mechanism) is required to be provided to protect a passenger at the time of a front-side collision, etc. For example, in JP-A-2004-338632, as shown in FIG. 6, a submarine prevention mechanism 103 having a complicated structure, separate from the seat cushion frame 102, is provided.

Furthermore, in a conventional steel seat cushion frame, although as the entire frame it is formed as a structure having a C-shaped planar shape opening to the rear side (the rear side of a seat), respective structural sections are manufactured as components separate from each other and it is structured by connecting them to each other.

As described above, because a conventional seat cushion frame for a vehicle is composed of steel, the weight is great, there is a limit in reducing the weight while securing the required rigidity for the entire seat cushion frame and, therefore, it is difficult to greatly reduce the weight.

Further, in when a submarine prevention mechanism is attached, because a complicated mechanism is attached as a component separated from the seat cushion frame, the number of components increases and the structure as a whole becomes complicated.

Furthermore, because a conventional seat cushion frame for a vehicle is structured by connecting respective structural sections manufactured as components separate from each other, the number of components is great, and many operations are required for the assembly.

Accordingly, paying attention to such problems in the conventional seat cushion frame for a vehicle, it could be helpful to provide a seat cushion frame for a vehicle in which a great lightening in weight can be achieved by changing the raw material of the main structural component to a resin, rigidity and strength required for a seat cushion frame can be secured by adequately supplementing a lack of rigidity or strength in merely changing to the resin, and utilizing the feature of the resin capable of readily integrally molding, while required functions such as a submarine prevention mechanism can be fulfilled, the number of components can be reduced and the overall structure can be simplified, and a production method therefor.

SUMMARY

We provide:
(1) a seat cushion frame for a vehicle, having a C-shaped planar shape opening to a rear side thereof, wherein a composite material containing reinforcing fibers which extend in at least a frame extension direction is integrated with an injection molded thermoplastic resin;
(2) the seat cushion frame according to (1), wherein said composite material is disposed on at least one of an upper surface and a lower surface of said frame;
(3) the seat cushion frame according to (2), wherein said composite material is disposed on each of said upper surface and said lower surface of said frame, and said composite material on said upper surface is disposed more than said composite material on said lower surface;
(4) the seat cushion frame according to (1), wherein a part of a side section of said C-shaped frame has a sectional shape opening toward outside of said frame;
(5) the seat cushion frame according to (4), wherein, in said sectional shape of a part of said side section of said C-shaped frame, a lower portion is extended toward outside of said frame longer than an upper portion;
(6) the seat cushion frame according to (1), wherein an areal weight of reinforcing fibers in a front section of said C-shaped frame is greater than an areal weight of reinforcing fibers in a side section of said frame;
(7) the seat cushion frame according to (1), wherein said composite material comprises said reinforcing fibers and a resin; and
(8) the seat cushion frame according to (1), wherein said reinforcing fibers comprise carbon fibers.

We further provide:
(1) a method of producing a seat cushion frame for a vehicle, having a C-shaped planar shape opening to a rear side thereof, including: disposing a composite material, arranged with reinforcing fibers in one direction, in a mold at a condition of setting an orientation direction of said reinforcing fibers in a frame extension direction; and injecting a thermoplastic resin into said mold to integrate said thermoplastic resin with said composite material;
(2) the method according to (1), wherein said composite material is disposed at a position in said mold corresponding to at least one of an upper surface and a lower surface of said frame;
(3) the method according to (2), wherein said composite material is disposed at each of positions in said mold corresponding to said upper surface and said lower surface of said frame, and said composite material at a position corresponding to said upper surface is disposed more than said composite material at a position corresponding to said lower surface;
(4) the method according to (1), wherein a part of a side section of said C-shaped frame is molded in a shape having a sectional shape opening toward outside of said frame;
(5) the method according to (4), wherein said sectional shape of a part of said side section of said C-shaped frame is formed in a shape in which a lower portion is extended toward outside of said frame longer than an upper portion;
(6) the method according to (1), wherein an areal weight of reinforcing fibers in a front section of said C-shaped frame is set greater than an areal weight of reinforcing fibers in a side section of said frame;
(7) the method according to (1), wherein said composite material comprises said reinforcing fibers and a resin; and (8) the method according to (1), wherein said reinforcing fibers comprise carbon fibers.

Figure 1:
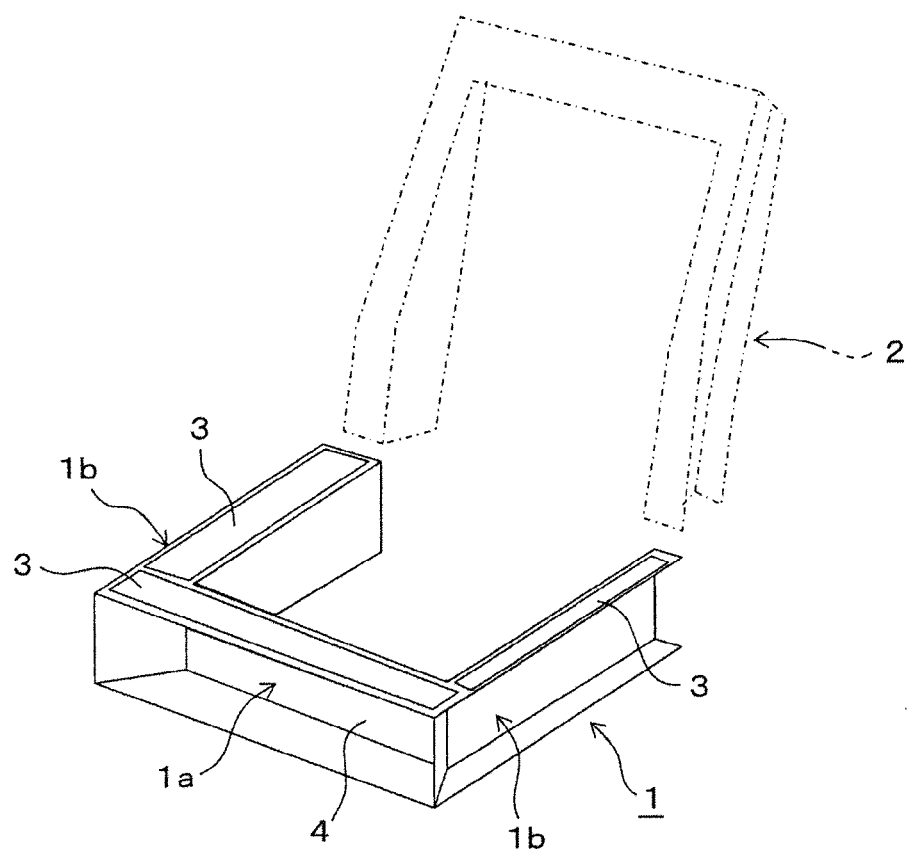
FIG. 1 is a schematic perspective view of a seat cushion frame for a vehicle.

EXPLANATION OF SYMBOLS 1, 11, 21, 31, 41: seat cushion frame
1a, 22b, 32: front section
1b, 22a: side section
2: seat back frame
3, 12a, 12b, 23, 33, 43a, 43b, 43c: composite material
4, 22: thermoplastic resin part
24: reinforcement rib
42a: upper portion
42b: lower portion
42c: vertical wall portion

DETAILED DESCRIPTION

We provide a seat cushion frame for a vehicle having a C-shaped planar shape opening to a rear side thereof, characterized in that a composite material containing reinforcing fibers which extend in at least a frame extension direction is integrated with an injection molded thermoplastic resin.

In such a seat cushion frame for a vehicle, the overall shape of the seat cushion frame is integrally formed by the thermoplastic resin which is injection molded, and because the raw material of the main structural components of the frame is made of a resin, the weight can be greatly reduced compared to that of a conventional steel frame. Then, because the composite material containing reinforcing fibers, which is high in rigidity and strength, is integrated with the injection molded thermoplastic resin, it becomes possible to remove the fear of lack of rigidity and strength when composed of only a thermoplastic resin, and it becomes possible to secure the necessary required rigidity and strength. Moreover, because the reinforcing fibers of the composite material integrated extend in at least a frame extension direction, the rigidity and strength of the seat cushion frame having a C-shaped planar frame shape can be increased efficiently and accurately, and it becomes possible to fulfill the required rigidity and strength securely and sufficiently. Furthermore, since the thermoplastic resin is injection molded and integrated with the composite material, the whole of the seat cushion frame is formed as an integrated body, as compared to the conventional structure formed by connecting components made separately from each other, it becomes possible to greatly reduce the number of components, and because connecting portions become unnecessary, it becomes possible to greatly simplify the overall structure. Still furthermore, even when the submarine prevention function as aforementioned is required, it also becomes possible to, without attaching a submarine prevention mechanism, provide a submarine prevention function to the front section itself of the C-shaped frame which has satisfactory rigidity and strength by integration of the composite material and the thermoplastic resin, and also from this point of view, it becomes possible to greatly reduce the number of components and greatly simplify the overall structure.

In the above-described seat cushion frame for a vehicle, it is preferred that the above-described composite material is disposed on at least one of an upper surface and a lower surface of the frame. Since for a seat cushion frame high rigidity and strength are required particularly against a load or an impact force applied in a vertical direction, rigidity and strength of the frame can be enhanced efficiently by the structure where the composite material as a material for reinforcement is disposed on at least one of an upper surface and a lower surface of the seat cushion frame.

Further, when the above-described composite material is disposed on each of the upper surface and the lower surface of the frame, it is preferred that the composite material on the upper surface is disposed more than the composite material on the lower surface. Since in a seat cushion frame a flexural moment is generated in the side section at the time of front-side collision or rear-side collision, thereby generating a great stress on the upper surface, the rigidity and strength of the frame can be efficiently enhanced by the structure where the composite material as a material for reinforcement is disposed on the upper surface.

Further, it is preferred that a part of a side section of the above-described C-shaped frame has a sectional shape opening toward the outside of the frame. With respect to a lateral load due to a seat belt or a load due to side collision, if the sectional shape of the side section is a closed-space shape (a sectional shape such as a tubular shape or a box-type shape), there is a fear causing a breakage of a frame itself by a condition where the side section props up against the load and the like, but in such a structure as described above, by the structure where a part of the side section is formed in a sectional shape opening toward the outside of the frame, it becomes possible to give the frame itself a performance capable of smoothly absorbing energy without causing its breakage.

In the above-described structure, a structure can be employed wherein, in the sectional shape of a part of the side section of the C-shaped frame, a lower portion extends toward the outside of the frame longer than an upper portion. In such a structure, it becomes possible to achieve, while with respect to the upper portion, to secure a good energy absorbing function by having the above-described opening shape, with respect to the lower portion, to give an appropriately high rigidity to the frame itself by adequately extending the lower portion.

Further, it is preferred that an areal weight of reinforcing fibers in a front section of the above-described C-shaped frame is greater than an areal weight of reinforcing fibers in a side section of the frame. When a submarine prevention function is required for the front section of a seat cushion frame as aforementioned, and by setting the areal weight of reinforcing fibers in the front section greater, it becomes possible to greatly enhance the degree of reinforcement of the front section to form the front section itself as a structure to be deformed more hardly, thereby exhibiting a more excellent submarine prevention function.

As the above-described composite material, although it is possible to employ, for example, a composite material of reinforcing fibers and a metal, from the viewpoint of reducing the weight of the seat cushion frame, preferably it is a composite material of reinforcing fibers and a resin.

As the reinforcing fibers of the above-described composite material, although it is possible to use arbitrary reinforcing fibers such as carbon fibers, glass fibers and aramide fibers, from the viewpoint of effect of increasing rigidity and strength and further from the viewpoint of ease of design of the rigidity and strength, it is preferred that the reinforcing fibers comprise at least carbon fibers. In this connection, included are the reinforcing fibers of the composite material are only carbon fibers and the reinforcing fibers are of a combination of carbon fibers and other reinforcing fibers.

Further, when the above-described composite material comprises a composite material of reinforcing fibers and a resin, as the matrix resin thereof, a thermoplastic resin and a thermosetting resin can be both used. In using a thermoplastic resin, for example, polyolefin-group resins such as polyethylene and polypropylene, polyamide-group resins such as nylon 6 and nylon 6, 6, polyester-group resins such as polyethylene terephthalate and polybutylene terephthalate, and resins such as polyether ketone, polyether sulfone and aromatic polyamide, can be used. Further, also as the injection molded thermoplastic resin to be integrated with the composite material, similar resins can be used.

In a method of producing a seat cushion frame for a vehicle, when the seat cushion frame having a C-shaped planar shape opening to a rear side thereof is produced, the method comprises the steps of: disposing a composite material, arranged with reinforcing fibers in one direction, in a mold at a condition of setting an orientation direction of the reinforcing fibers in a frame extension direction; and injecting a thermoplastic resin into the mold to integrate the thermoplastic resin with the composite material.

Also in this method of producing a seat cushion frame for a vehicle, it is preferred that the above-described composite material is disposed at a position in the mold corresponding to at least one of an upper surface and a lower surface of the frame.

Further, when the above-described composite material is disposed at each of positions in the mold corresponding to the upper surface and the lower surface of the frame, it is preferred that the composite material at a position corresponding to the upper surface is disposed more than the composite material at a position corresponding to the lower surface.

Further, to provide an adequate energy absorbing function, it is preferred that a part of a side section of the above-described C-shaped frame is molded in a shape having a sectional shape opening toward outside of the frame.

In this case, to provide an appropriately high rigidity to the frame itself in addition to the above-described adequate energy absorbing function, a structure can also be employed wherein the above-described sectional shape of a part of the side section of the C-shaped frame is formed in a shape in which a lower portion is extended toward outside of the frame longer than an upper portion.

Further, to give a more adequate submarine prevention function to the front section of the above-described C-shaped frame, it is preferred that an areal weight of reinforcing fibers in the front section is set greater than an areal weight of reinforcing fibers in a side section of the frame.

Further, it is preferred that the above-described composite material comprises a composite material of the above-described reinforcing fibers and a resin.

Furthermore, it is preferred that the above-described reinforcing fibers comprise carbon fibers.

Thus, in the seat cushion frame for a vehicle and the production method, the weight of the entire frame can be greatly reduced, the rigidity and strength required for each section of the frame can be readily secured, required functions such as submarine prevention, or the like, can be fulfilled, the number of components can be greatly reduced, and the overall structure can be greatly simplified.

Hereinafter, examples will be explained referring to the figures.

FIG. 1 shows a seat cushion frame for a vehicle. In FIG. 1, symbol 1 indicates a seat cushion frame for a vehicle, and to the rear side of the seat cushion frame 1, a seat back frame 2 is connected rotatably. Seat cushion frame 1 has a C-shaped planar shape the rear side of which is set as its opening side, and has a front section 1a and side sections 1b on both sides. In this seat cushion frame 1, a composite material 3 containing reinforcing fibers which extend in at least a frame extension direction is integrated with an injection molded thermoplastic resin part 4. The integration can be realized, for example, by disposing a composite material 3 arranged with reinforcing fibers in one direction (unidirectional fiber reinforced composite material) in a mold (not shown in the figure) at a condition of setting the orientation direction of the reinforcing fibers in a frame extension direction, and injecting a thermoplastic resin for forming the thermoplastic resin part 4 into the mold to integrate the thermoplastic resin with the composite material 3. As aforementioned, the reinforcing fibers of composite material 3 preferably comprise carbon fibers. By the integration structure of the injection molded thermoplastic resin and composite material 3, while rigidity and strength required for respective sections of the frame can be secured, reduction in weight and simplification in structure as the whole of seat cushion frame 1 can be achieved. Further, it becomes possible to give a submarine prevention function to the front section 1a of this seat cushion frame 1 without attaching another mechanism.

In FIG. 1, although the cross-sectional shape of each of the front section 1a and the side section 1b of the thermoplastic resin part 4 is formed as a C-shaped cross-sectional shape opening toward outside of the frame 1, this is one example, and other arbitrary cross-sectional shapes can be employed. Further, in FIG. 1, although a tape-like unidirectional fiber reinforced composite material 3 is used, also in this regard, arbitrarily formed fiber reinforced composite materials can be used. Further, in FIG. 1, although the unidirectional fiber reinforced composite material 3 is disposed on the upper surface of the frame, it is also possible to dispose it on the lower surface side, and to dispose it on both surface sides. Furthermore, it is also possible to dispose it at an intermediate position in the vertical direction of the frame. When the unidirectional fiber reinforced composite material 3 is disposed on each of the upper surface and the lower surface of the frame, it is preferred that the composite material on the upper surface is disposed more than the composite material on the lower surface.

Figure 2:
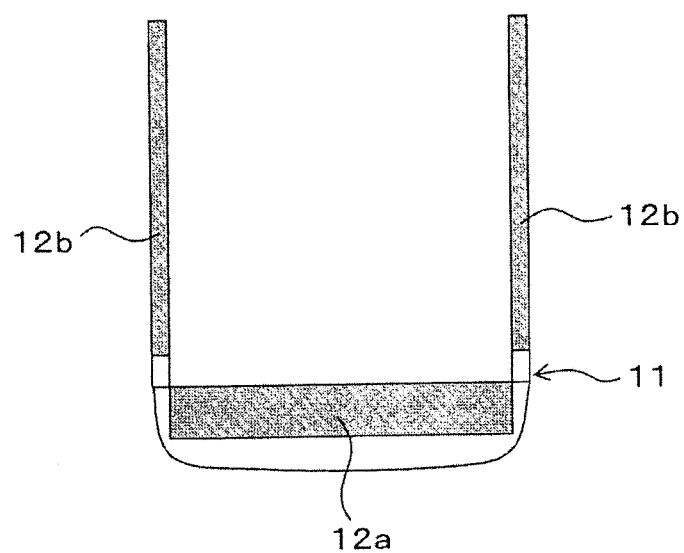
FIG. 2 is a schematic plan view of a seat cushion frame similar to that shown in FIG. 1.

FIG. 2 shows a schematic plan view of a seat cushion frame 11 similar to that shown in FIG. 1. In FIG. 2, the disposition area of a fiber reinforced composite material 12a in the front section of seat cushion frame 11 (disposition area of the composite material 12a per a frame unit length) is set greater than the disposition area of a fiber reinforced composite material 12b in the side section (disposition area of the composite material 12b per a frame unit length), and the front section is more reinforced than the side section by the fiber reinforced composite material.

This degree of reinforcement can be carried out also by changing the areal weight of reinforcing fibers (weight of reinforcing fibers per unit area) in the composite material. Namely, the areal weight of reinforcing fibers of the fiber reinforced composite material 12a in the front section of the seat cushion frame 11 may be set greater than the areal weight of reinforcing fibers of the fiber reinforced composite material 12b in the side section.

By thus enhancing the degree of reinforcement in the front section due to the composite material than the degree of reinforcement in the side section, it becomes possible to exhibit an excellent submarine prevention function by the front section.

Figure 3:
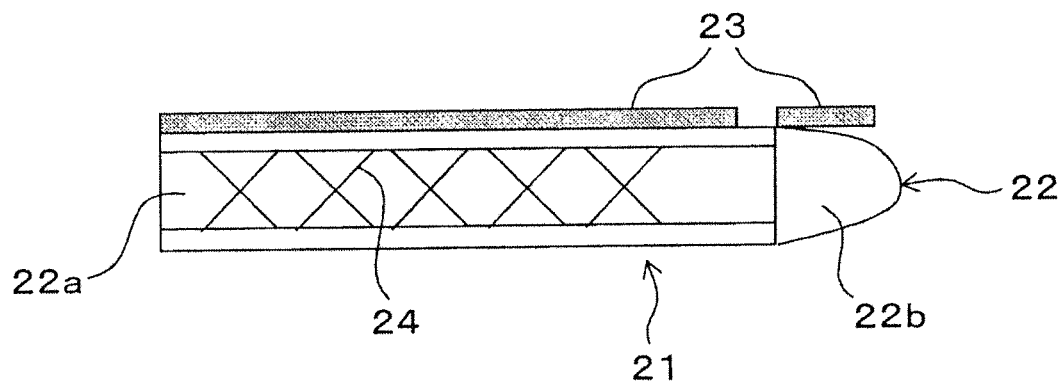
FIG. 3 is a schematic side view of a seat cushion frame similar to that shown in FIG. 1.

FIG. 3 shows a schematic side view of a seat cushion frame 21 similar to that shown in FIG. 1. Similarly as shown in FIGS. 1 and 2, an injection molded thermoplastic resin part 22 and a composite material 23 disposed thereon are integrated. Further, in the example shown in FIG. 3, reinforcement ribs 24 is molded integrally in a side section 22a of the thermoplastic resin part 22 having a C-shaped cross-sectional shape. Thus, as needed, it is possible to structurally reinforce a specified portion of the thermoplastic resin part 22 itself.

Further, in the example shown in FIG. 3, a front section 22b of the thermoplastic resin part 22 is formed as a cross-sectional shape curved in an arc-like shape toward a forward direction. The composite material 23 at this portion can also be disposed along the curved arc-like shape. By forming the cross-sectional shape of the front section 22b in a curved arc-like shape, in case where a cushion material or a fabric is stuck on the seat cushion frame 21, it becomes possible to improve the abrasion resistance thereof. Thus, as the cross-sectional shape of the front section 22b, further as the cross-sectional shapes of the respective sections of the seat cushion frame 21, appropriately arbitrary shapes can be employed.

Figure 4:
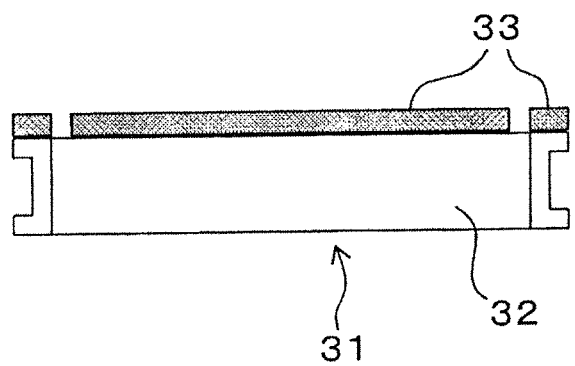
FIG. 4 is a schematic elevational view of a seat cushion frame similar to that shown in FIG. 1.

FIG. 4 shows a schematic elevational view of a seat cushion frame 31 similar to that shown in FIG. 1. Similarly as shown in FIGS. 1 to 3, an injection molded thermoplastic resin part 32 and a composite material 33 disposed thereon are integrated. The example shown in FIG. 4 is simplified in cross-sectional shape of front section as compared with the example shown in FIG. 1.

Although examples disposing a composite material on the upper surface side of the frame are shown in FIGS. 1 to 4, even if disposed on the lower surface side, a similar effect can be obtained as reinforcement effect for respective beam-like frame sections. Further, as aforementioned, when the composite material is disposed on each of the upper surface and the lower surface of the frame, it is preferred that the composite material on the upper surface is disposed more than the composite material on the lower surface.

Figure 5:
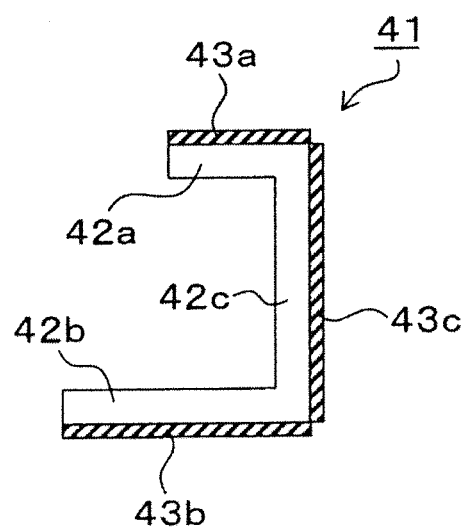
FIG. 5 is a schematic vertical sectional view of a side section of a seat cushion frame for a vehicle.
Figure 6:
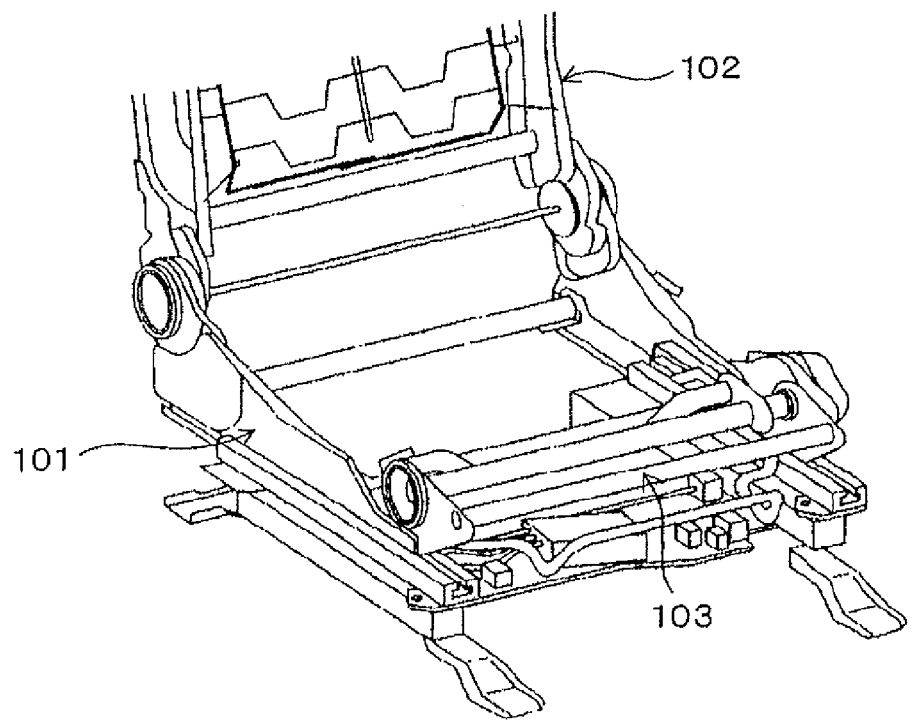
FIG. 6 is a schematic perspective view of a conventional seat cushion frame for a vehicle.

Furthermore, FIG. 5 shows a schematic vertical sectional view of a part of a side section of a seat cushion frame for a vehicle 41 according to another example. In this example, similarly in the above-described respective examples, a part of a side section has a sectional shape opening toward outside of the frame 41, and in such a sectional shape, a lower portion 42b is extended toward outside of the frame 41 longer than an upper portion 42a, and the respective portions of the upper portion 42a, the lower portion 42b and a vertical wall portion 42c positioned therebetween are reinforced by composite materials 43a, 43b and 43c each containing reinforcing fibers. In such a structure, as aforementioned, by the sectional shape opening toward outside of the frame 41, against a lateral load due to a seat belt or a load due to side collision, it becomes possible to make the frame itself smoothly absorb an energy without causing its breakage, and by extending the lower portion 42b toward outside of the frame 41 longer than the upper portion 42a, it becomes possible to give an appropriately high rigidity to the frame itself while securing the above-described good energy absorbing performance.

INDUSTRIAL APPLICATIONS

Our methods can be applied to any of seat cushion frames for vehicles which are made of a metal at the present time.

The invention claimed is:

1. A seat cushion frame for a vehicle, having a C-shaped planar shape opening to a rear side thereof, wherein a composite material containing reinforcing fibers which extend in at least a frame extension direction is integrated with an injection molded thermoplastic resin and an areal weight of reinforcing fibers in a front section of said C-shaped frame is greater than an areal weight of reinforcing fibers in a side section of said frame.

2. The seat cushion frame according to claim 1, wherein said composite material is disposed on at least one of an upper surface and a lower surface of said frame.

3. The seat cushion frame according to claim 2, wherein said composite material is disposed on each of said upper surface and said lower surface of said frame, and said composite material on said upper surface is disposed more than said composite material on said lower surface.

4. The seat cushion frame according to claim 3, wherein a part of a side section of said C-shaped frame has a sectional shape opening toward outside of said frame.

5. The seat cushion frame according to claim 2, wherein a part of a side section of said C-shaped frame has a sectional shape opening toward outside of said frame.

6. The seat cushion frame according to claim 1, wherein a part of a side section of said C-shaped frame has a sectional shape opening toward outside of said frame.

7. The seat cushion frame according to claim 6, wherein, in said sectional shape of a part of said side section of said C-shaped frame, a lower portion is extended toward outside of said frame longer than an upper portion.

8. The seat cushion frame according to claim 1, wherein said composite material comprises said reinforcing fibers and a resin.

9. The seat cushion frame according to claim 1, wherein said reinforcing fibers comprise carbon fibers.

10. A method of producing a seat cushion frame for a vehicle, having a C-shaped planar shape opening to a rear side thereof, comprising:
    disposing a composite material, arranged with reinforcing fibers in one direction, in a mold at a condition of setting an orientation direction of said reinforcing fibers in a frame extension direction; and
    injecting a thermoplastic resin into said mold to integrate said thermoplastic resin with said composite material such that an areal weight of reinforcing fibers in a front section of said C-shaped frame is greater than an areal weight of reinforcing fibers in a side section of said frame.

11. The method according to claim 10, wherein said composite material is disposed at a position in said mold corresponding to at least one of an upper surface and a lower surface of said frame.

12. The method according to claim 11, wherein said composite material is disposed at each of positions in said mold corresponding to said upper surface and said lower surface of said frame, and said composite material at a position corresponding to said upper surface is disposed more than said composite material at a position corresponding to said lower surface.

13. The method according to claim 10, wherein a part of a side section of said C-shaped frame is molded in a shape having a sectional shape opening toward outside of said frame.

14. The method according to claim 13, wherein said sectional shape of a part of said side section of said C-shaped frame is formed in a shape in which a lower portion is extended toward outside of said frame longer than an upper portion.

15. The method according to claim 10, wherein said composite material comprises said reinforcing fibers and a resin.

16. The method according to claim 10, wherein said reinforcing fibers comprise carbon fibers.

* * * * *